United States Patent
Kang

(10) Patent No.: US 6,268,943 B1
(45) Date of Patent: Jul. 31, 2001

(54) OPTICAL SNR MEASURER IN WDM OPTICAL TRANSMITTING DEVICE

(75) Inventor: Yong-Hoon Kang, Koyang-shi (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/342,048

(22) Filed: Jun. 28, 1999

(30) Foreign Application Priority Data

Jul. 2, 1998 (KR) .................................................. 98-26513

(51) Int. Cl.[7] .............................. H04B 10/08; H04J 14/02
(52) U.S. Cl. .......................................... 359/110; 359/124
(58) Field of Search ...................................... 359/110, 124, 359/125–134, 109–195; 250/214 R, 214 C, 227.12, 227.24

(56) References Cited

U.S. PATENT DOCUMENTS

| 5,010,346 | * | 4/1991 | Hamilton | 341/137 |
| 5,654,816 | * | 8/1997 | Fishman | 359/177 |
| 5,689,594 | | 11/1997 | Mao . | |
| 5,796,479 | | 8/1998 | Derickson et al. . | |
| 5,894,362 | | 4/1999 | Onaka et al. . | |
| 5,986,782 | * | 11/1999 | Alexander et al. | 359/110 |

* cited by examiner

Primary Examiner—Leslie Pascal
Assistant Examiner—Christina Y. Leung
(74) Attorney, Agent, or Firm—Robert E. Bushnell, Esq.

(57) ABSTRACT

An optical SNR (Signal-to-Noise Ratio) measurer in a wavelength division multiplexing optical transmitting device. In the optical SNR measurer, a wavelength division demultiplexer demultiplexes an optic signal wavelength-division-multiplexed from a plurality of signal channels into optical signals of the signal channels and an optical signal of a noise channel in the vicinity of the signal channels and a different wavelength, an optical tap separates a predetermined percentage of an optical signal of signal channel adjacent to the noise channel among the separated signal channels, a first optical detector detects the optical signal separated by the optical tap and converts the detected optical sign to an electrical signal, a second optical detector detects the optical signal of the noise channel an converting the detected optical signal to an electrical signal, and an operating unit obtains an optical SNR by calculating a ratio of the strength of the electrical signal received from the first optical detector to that of the electrical signal received from the second optical detector.

8 Claims, 3 Drawing Sheets

OPTICAL SNR MEASURER IN WDM OPTICAL TRANSMITTING DEVICE

CLAIM OF PRIORITY

This application makes reference to, incorporates the same herein, and claims all benefits accruing under 35 U.S.C. §119 from an application Entitled Optical SNR Measurer In WDM Optical Transmitting Device earlier filed in the Korean Industrial Property Office on Jul. 2 1998, and there duly assigned Ser. No. 98-26513.

BACKGROUND OF THE INVENTION

1. Field of the Invention

The present invention relates to a signal-to-noise ratio (SNR) measurer, and in particular, to an optical SNR measurer in a system using a wavelength division multiplexing (WDM) transmission scheme.

2. Description of the Related Art

Wavelength division multiplexing is one of optical signal transmitting techniques, in which a plurality of optical signals at different optical wavelengths are simultaneously propagated through a strand of optical fiber. Wavelength division demultiplexing in the wavelength division multiplexing transmission scheme refers to separation of an optical signal multiplexed on a strand of optical fiber into its constituent optical signals.

An optical SNR is a very significant factor in a wavelength division multiplexing optical transmitting device because it directly affects optical signal quality. U.S. Pat. No. 5,689,594 to Xiaoping Charles Mao entitled Multiple Wavelength Bidirectional Lightwave Amplifier discusses an eight wavelength multiple wavelength bidirectional lightwave amplifier which optimizes the signal-to-noise ratio of each wavelength by automatically compensating for any gain change in the wavelengths. U.S. Pat. No. 5,796,479 to Dennis Derickson et al. entitled Signal Monitoring Apparatus For Wavelength Division Multiplexed Optical Telecommunication Networks describes a detector array spectrometer which provides efficient use of detectors to simultaneously monitor wavelength, power, and signal-to-noise ratio of wavelength division multiplexing channels in optical telecommunication networks. The detector array spectrometer incorporates an angled diffraction grating to achieve compact size, while spatially separating component signals from each of the wavelength division multiplexing channels according to the channels' wavelengths. The component signals provided by the diffraction grating are incident on an array of split-detectors that conforms to the spatial separation of the component signals. While the split-detectors receive a signal from each wavelength division multiplexing channel, noise detectors positioned between adjacent split-detectors measure noise levels between wavelength division multiplexing channels. Each of two halves of each split-detector is equally illuminated by the component signal when the wavelength division multiplexing channel is operating at its designated channel wavelength. Output signals from the two halves are summed to monitor the power of the wavelength division multiplexing channel, while the difference between the output signals from the two halves indicates deviation from the designated wavelength division multiplexing channel wavelength. The ratio of the power in the wavelength division multiplexing channel to the noise level measured by the adjacently positioned noise detector monitors the SNR of the wavelength division multiplexing channel. U.S. Pat. No. 5,894,362 to Hiroshi Onaka et al. entitled Optical Communication System Which Determines The Spectrum Of A Wavelength Division Multiplexed Signal And Performs Various Processes In Accordance With The Determined Spectrum describes signal-to-noise ratio (SNR) detection in each channel of wavelength division multiplexed signal light. The SNR in each channel can be obtained by calculating the ratios between peak powers in each channel and noise components near the respective channels. Further, true signal power can be calculated by subtracting noise component power near each channel from the peak power of each signal in the corresponding channel. The operational conditions and optical output of the optical amplifier can be suitably set according to both the true signal power in each channel and the total optical power inclusive of noise power. More specifically, the power of pumping light is controlled according to the result of measurement of the total optical power inclusive of noise power, thereby making flat the gain characteristic of the optical amplifier (the characteristic representing the relation between gain and wavelength). Further, the optical output of the optical amplifier can be controlled so as to make constant the true signal power or the average of true signal powers in channels in the case that the number of the channels has been recognized. Control processing includes detecting a "first" signal-to-noise ratio of the wavelength division multiplexed signal light before the Wavelength division multiplexed light is amplified. The monitoring unit also detects a "second" signal-to-noise ratio of the wavelength division multiplexed signal light after the wavelength division multiplexed signal light is amplified. The monitoring unit then determines a noise figure from the ratio of the first signal-to-noise ratio to the second signal-to-noise ratio and, utilizing the noise figure, controls the optical amplifier so as to make constant the detected true signal power. Additionally, the control processing can also include controlling the optical amplifier in accordance with the determined noise figure to achieve a desired noise figure.

It is also known that in order to measure the optical SNR, the wavelength division multiplexing optical transmitting device typically uses a multichannel optical SNR measurer, due to the multiplexing of optical signals of plural signal channels at different wavelengths on a strand of optical fiber, and measures an optical SNR for each channel. For this operation, the optical SNR measurer is provided with a filter. This filter is virtually the same in function and configuration as a wavelength division demultiplexer for demultiplexing a wavelength division multiplexed optical signal into optical signals of signal channels in a wavelength division multiplexing optical transmitting device. The filter as well as the wavelength division demultiplexer is expensive.

As described above, the conventional wavelength division multiplexing optical transmitting device additionally uses a filter for separating an optical signal for each channel from a wavelength division multiplexed optical signal so that optical SNR can be measured, resulting in a cost increase.

SUMMARY OF THE INVENTION

An object of the present invention is to provide an optical SNR measurer in a wavelength division multiplexing optical transmitting device, which obviates the need for a filter for separating an optical signal for each channel from a wavelength division multiplexed optical signal.

To achieve the above object, there is provided an optical SNR measurer in a wavelength division multiplexing optical transmitting device. In the optical SNR measurer, a wavelength division demultiplexer demultiplexes an optical signal wavelength-division-multiplexed from a plurality of signal channels into optical signals of the signal channels and an optical signal of a noise channel in the vicinity of the signal channels and at a different wavelength, an optical tap separates a predetermined percentage of an optical signal of a signal channel adjacent to the noise channel among the separated signal channels, a first optical detector detects the optical signal separated by the optical tap and converts the detected optical signal to an electrical signal, a second optical detector detects the optical signal of the noise channel and converting the detected optical signal to an electrical signal, and an operating unit obtains an optical SNR by calculating a ratio of the strength of the electrical signal received from the first optical detector to that of the electrical signal received from the second optical detector.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 1:
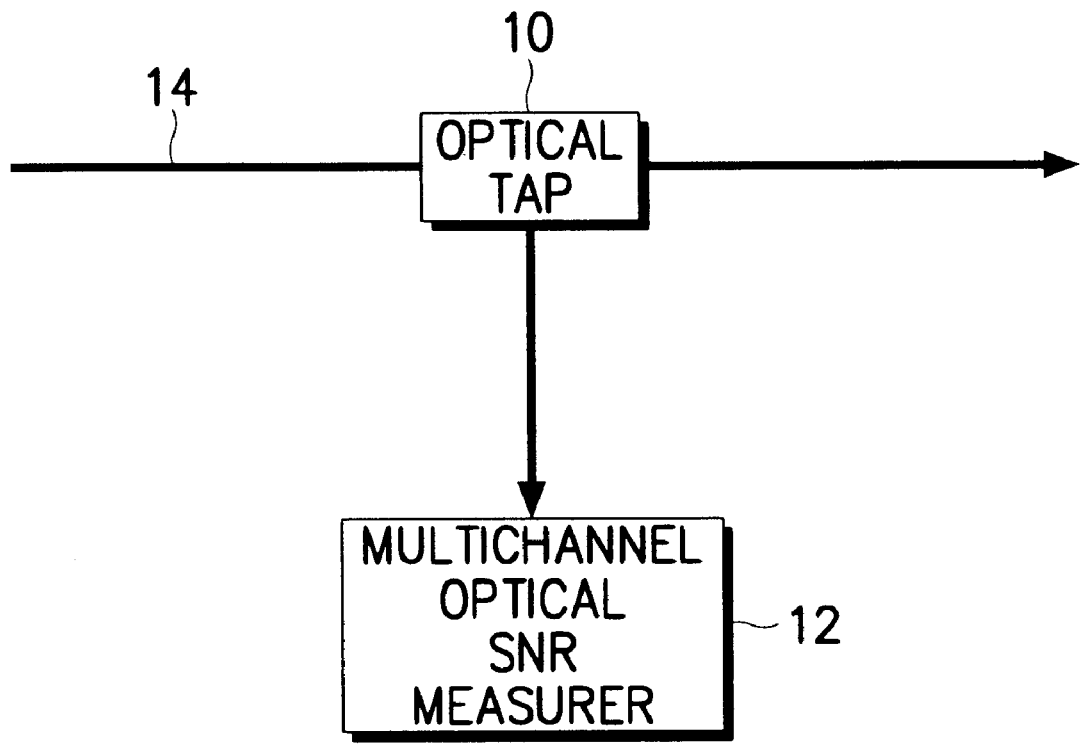
FIG. 1 is a view exemplarily illustrating a typical multichannel optical SNR measurer connected to an optical transmission line.

FIG. 1 is a schematic view of an exemplarily wavelength division multiplexing optical transmitting device with a multichannel optical SNR measurer 12 connected to an optical transmission line 14 via an optical tap 10. Referring to FIG. 1, the optical transmission line 14 corresponds to an optical fiber onto which optical signals at different wavelengths are multiplexed, and the optical tap 10 separates a predetermined percentage of the optical signal received through the optical tap 10. The intensity of the separated optical signal reaches, for example, 5% of the optical source signal. The optical SNR measurer 12 separates the optical signals of signal channels at different wavelengths from the optical signal received from the optical, tap 10 and measures an optical SNR for each channel. For this operation, the optical SNR measurer 12 is provided with a filter.

Since a filter is the same in function and configuration as a wavelength division demultiplexer essential to a wavelength division multiplexing optical transmitting device, the latter substitutes for the filter in the present invention.

The wavelength division demultiplexer in the present invention separates an optical signal of a channel adjacent to signal channels and having a different wavelength from a wavelength division multiplexed optical signal. The intensity of the separated optical signal is that of optical noise present beyond a signal wavelength range. An optical SNR can be obtained by calculating a ratio of the intensity of this optical signal to that of the optical signal of an adjacent signal channel. In the present invention, a channel adjacent to signal channels multiplexed to a wavelength division multiplexed optical signal and having a different wavelength is termed a noise channel.

Such a noise channel may be a channel beyond a signal wavelength band, a channel between some adjacent channels within the signal wavelength band, or both. The number of noise channels can be one or more. The more in kind and number the noise channels, the more accurately the of noise can be measured.

In addition to signal channels, the noise channels should also be separated from a wavelength division multiplexed optical signal. Hence, the wavelength division demultiplexer is modified in the same way.

Figure 2:
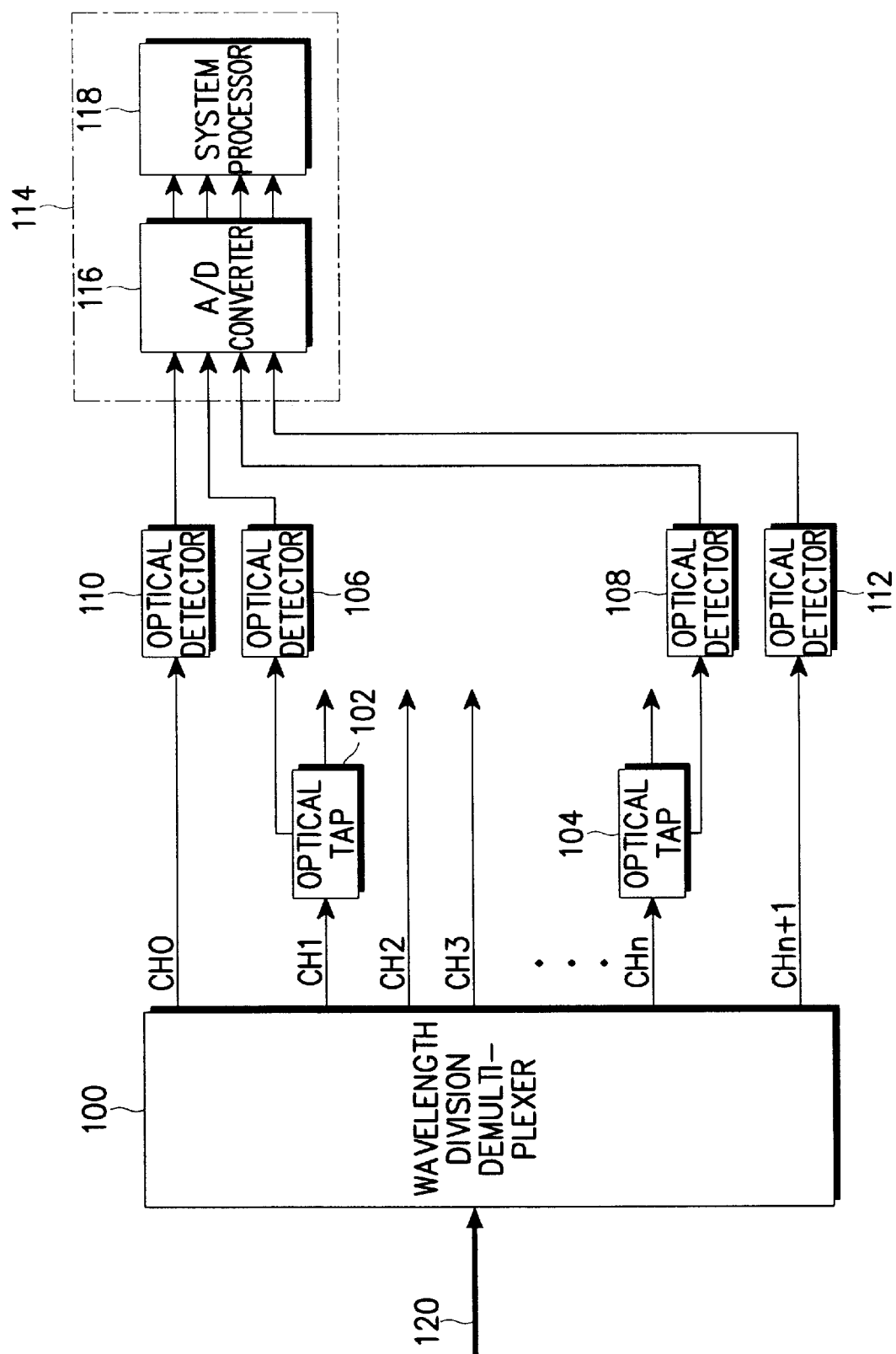
FIG. 2 is a block diagram of an optical SNR measurer according to an embodiment of the present invention.

FIG. 2 is a block diagram of an optical SNR measurer according to an embodiment of the present invention. Two channels present at both ends of a signal wavelength band are designated as noise channels and optical SNRs are measured from two signal channels adjacent to both the noise channels, by way of example. Assuming that a typical wavelength division demultiplexer demultiplexes a wavelength division multiplexed optical signal into optical signals for n signal channels CH1 to CHn, a wavelength division demultiplexer 100 is configured to separate the wavelength division multiplexed optical signal into the two noise channels CH0 and CH(n+1) as well as the signal channels CH1 to CHn.

Figure 3:
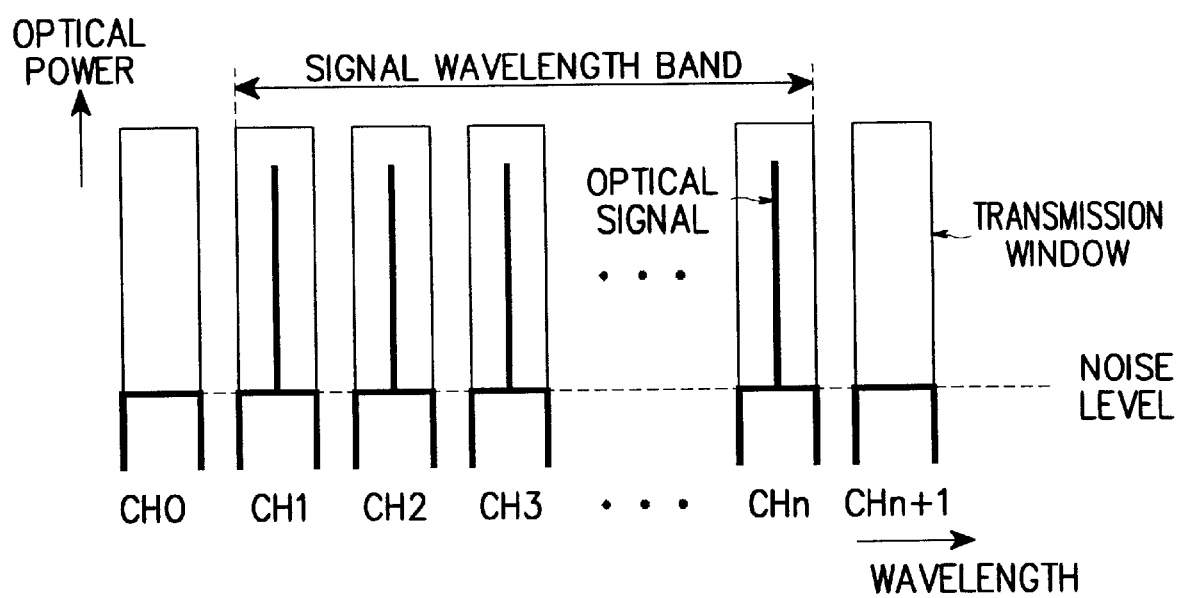
FIG. 3 is a view illustrating a demultiplexing spectrum of a wavelength division demultiplexer for use in measuring an optical SNR according to the embodiment of the present invention.

That is, the optical SNR measurer of FIG. 2 sets as the noise channels the two channels at both ends of the signal wavelength band as shown in the demultiplexing spectrum of the wavelength division demultiplexer 100 of FIG. 3. In FIG. 3, the optical power of the noise channels CH0 and CH(n+1) indicates a noise level and the transmission windows of the channels CH0 to CH(n+1) separated by the wavelength division demultiplexer 100 are also illustrated.

Therefore, the wavelength division demultiplexer 100 demultiplexes a wavelength division multiplexed optical signal received through an optical transmission line 120 into optical signals of the signal channels CH1 to CHn. The thus-separated optical signals of the signal channels CH1 to CHn correspond to optical signals demultiplexed in a typical optical transmitting device and thus are fed to corresponding portions of the device. Yet, optical signals of the signal channels CH1 and CHn adjacent to the noise channels are fed to optical taps 102 and 104, respectively, so an optical SNR can be measured. The optical tap 102 separates a predetermined percentage of the optical signal of the signal channel CH1, while the optical tap 104 separates a predetermined percentage of the optical signal of the signal channel CHn. Optical detectors 106 and 108 detect the optical signals separated by the optical taps 102 and 104, convert the detected optical signals to electrical signals, and feed the electrical signals to an operating unit 114.

Meanwhile, optical signals of the noise channels CH0 and CH(n+1) are fed to optical detectors 110 and 112, respectively. The optical detectors 110 and 112 detect the optical signals separated by the optical taps 110 and 112, convert the detected optical signals to electrical signals, and feed the electrical signals to the operating unit 114.

The operating unit 114 obtains an optical SNR by calculating a ratio of the strength of the electrical signals received from the optical detectors 106 and 108 to that of the electrical signals received from the optical detectors 110 and 112. The operating unit 114 includes an analog-to-digital (A/D) converter 116 and a system processor 118 used as a main controller for the optical transmitting device to which the optical SNR measurer of FIG. 2 is applied. The A/D converter 116 converts the electrical signals received from the optical detectors 106 to 112 to digital signals. The system processor 118 calculates the ratio of the strengths of the signals received from the A/D converter 116 to obtain an optical SNR.

To be more specific, the noise channels CH0 and CH(n+1) contain optical noise present outside the signal wavelength band ranging from the signal channel CH1 to the signal channel CHn. Hence, if optical noise in the signal channels CH1 and CHn and optical noise in the noise channels CH0 and CH(n+1) are made to be approximate to the same level in view of their proximity in wavelengths, optical SNRs can be obtained by calculating a ratio of the of the signal channel CH1 to that of the noise channel CH0 and a ratio of the of the signal channel CHn to that of the noise channel CH(n+1). A method of calculating a SNR is generally known and thus will not be described here.

Though the accuracy with which the optical SNR is measured varies with the gain flatness of an optical detector, the noise can be accurately measured as there are more noise channels in kind and number. Furthermore, application of AWG (Arrayed Waveguide Grating) technology to the wavelength division demultiplexer allows a noise level alone or the level of noise including cross talk noise to be measured by controlling an FSR (Free Spectral Range), thereby increasing the optical SNR measurement accuracy.

According to the present invention as described above, a wavelength division demultiplexer in a wavelength division multiplexing optical transmitting device can also be used to measure an optical SNR, thereby obviating the need for a filter for separating an optical signal for each channel from a wavelength division multiplexed optical signal and reducing cost.

While the present invention has been described in detail with reference to the specific embodiment, it is a mere exemplary application. In particular, the number of noise channels or their associated signal channels can be one or more, or different numbers of noise channels and signal channels can be employed. In addition, a channel between some adjacent signal channels within a signal wavelength band may be designated as a noise channel. Thus, it is to be clearly understood that many variations can be made by anyone skilled in the art within the scope and spirit of the present invention.

What is claimed is:

1. An optical signal-to-noise ratio measurer in a wavelength division multiplexed optical transmitting device, comprising:

a wavelength division demultiplexer for demultiplexing an optical signal wavelength division-multiplexed from a plurality of signal channels into optical signals of the signal channels and an optical signal of a noise channel in the vicinity of the signal channels and at a different wavelength;

an optical tap for separating a predetermined percentage of an optical signal of a signal channel adjacent to the noise channel among the separated signal channels;

a first optical detector for detecting the optical signal separated by the optical tap and converting the detected optical signal to an electrical signal;

a second optical detector for detecting the optical signal of the noise channel and converting the detected optical signal to an electrical signal; and an operating unit for obtaining an optical signal-to-noise ratio by calculating a ratio of the strength of the electrical signal received from the first optical detector to that of the electrical signal received from the second optical detector.

2. The optical signal-to-noise ratio measurer of claim 1, wherein the noise channel is present outside a signal wavelength band.

3. The optical signal-to-noise ratio measurer of claim 1, wherein the noise channel is present between adjacent signal channels.

4. An optical signal-to-noise ratio measurer in a wavelength division demultiplexed optical transmitting device, comprising:

a wavelength division demultiplexer for demultiplexing an optical signal wavelength division-multiplexed from a plurality of signal channels into optical signals of the signal channels and optical signals of at least two noise channels in the vicinity of the signal channels and at different wavelengths;

a plurality of first optical detectors for detecting the optical signals of the noise channels separated by the wavelength division demultiplexer and converting the detected optical signals to electrical signals;

a plurality of optical taps for separating predetermined percentages of each of the optical signals of the signal channels adjacent to each of the noise channels;

a plurality of second optical detectors for detecting the optical signals separated by the optical taps and converting the detected optical signals to electrical signals; and an operating unit for obtaining optical signal-to-noise ratio signals by calculating the ratio of the strength of the electrical signals received from the first optical detectors to that of the electrical signals received from the second optical detectors.

5. The optical signal-to-noise measurer of claim 4, wherein the noise channels are at least two channels present at both ends of a signal wavelength band.

6. The optical signal-to-noise measurer of claim 4, wherein the noise channels further include a channel between adjacent signal channels.

7. An optical signal-to-noise ratio measurer in a wavelength division multiplexed optical transmitting device, comprising:

a wavelength division demultiplexer for demultiplexing an optical signal wavelength-division-multiplexed from a plurality of signal channels into a plurality optical signals of the signal channels and a pair of optical signals of noise channels outside a signal band of said signal channels;

a first optical detector for detecting the optical signal of the noise channel adjacent a first end of said signal band and converting the detected optical signal to a first electrical signal;

a second optical detector for detecting the optical signal of the noise channel adjacent a second end of said signal band and converting the detected optical signal to a second electrical signal;

a first optical tap for separating a predetermined percentage of the optical signal of the signal channel adjacent said first end of said signal band;

a third optical detector for detecting the optical signal separated by the first optical tap and converting the detected optical signal to a third electrical signal;

a second optical tap for separating a predetermined percentage of the optical signal of the signal channel adjacent said second end of said signal band;

a fourth optical detector for detecting the optical signal separated by the second optical tap and converting the detected optical signal to a fourth electrical signal; and an operating unit for obtaining a first optical signal-to-noise ratio signal by calculating a ratio of the strength of the first electrical signal to third electrical signal and a second optical signal-to-noise ratio signal by calculating a ratio of the strength of the second electrical signal to fourth electrical signal.

8. The optical signal-to-noise ratio measurer of claim 7, wherein said operating unit comprises:

an analog to digital converter for converting said first through fourth electrical signals to first to fourth digital signals; and a system processor for calculating said first and second optical signal-to-noise ratios in response to said first to fourth digital signals.

* * * * *